United States Patent [19]

Klare

[11] Patent Number: 4,645,709

[45] Date of Patent: Feb. 24, 1987

[54] COATED GLASS FABRIC

[75] Inventor: Robert J. Klare, Marietta, Ohio

[73] Assignee: E.I. Du Pont de Nemours and Company, Wilmington, Del.

[21] Appl. No.: 867,158

[22] Filed: May 27, 1986

[51] Int. Cl.$^4$ .................................................. B32B 7/00
[52] U.S. Cl. ..................................... 428/251; 427/387; 427/407.3; 428/240; 428/246; 428/266; 428/268; 428/283; 428/285
[58] Field of Search ............... 428/240, 244, 246, 251, 428/266, 268, 283, 285; 427/375, 387, 389.8, 407.3

[56] References Cited

U.S. PATENT DOCUMENTS

| | | | |
|---|---|---|---|
| 3,928,703 | 12/1975 | Cook | 428/268 |
| 3,968,297 | 7/1976 | Sauer | 428/268 |
| 4,316,930 | 2/1982 | Stengle | 428/268 |
| 4,342,803 | 8/1982 | Stengle | 428/268 |
| 4,347,278 | 8/1982 | Flautt et al. | 428/268 |
| 4,370,376 | 1/1983 | Gangal et al. | 428/268 |
| 4,431,698 | 2/1984 | Case et al. | 428/268 |
| 4,486,495 | 12/1984 | Matsushita et al. | 428/268 |

*Primary Examiner*—James J. Bell

[57] ABSTRACT

A woven glass fabric is provided which contains coatings in sequence of a silicone oil, a particulate solid, and a high molecular weight polytetrafluoroethylene, or an elastomeric fluoropolymer.

4 Claims, No Drawings

COATED GLASS FABRIC

BACKGROUND OF THE INVENTION

This invention relates to glass fabric coated with protective layers of coatings. Fluoropolymer coatings for glass fabrics are used to increase strength, weatherability, flexibility, and resistance to flex wear of the fabric. Improvements in flexibility, flex wear and strength are always sought after goals, but they sometimes confict. For example, good flexibility is usually achieved by reducing coating weight but reducing the weight usually decreases strength and wear resistance.

SUMMARY OF THE INVENTION

This invention provides glass fabric of improved flex life, flex wear and strength by providing coatings on the fabric of specific ingredients and a specified sequence of application.

Specifically, a coated woven glass fabric is provided which contains coatings in sequence of (a) a silicone oil (primer oil coat hereinafter) present on the fabric at a loading of between 3-20% by weight based on glass fabric, (b) a particulate organic polymer or inorganic solid in which the particles are less than 0.3 micrometers in diameter, and preferably less than 0.17 micrometers, present at a loading of between 4-14% by weight based on a glass fabric (primer particulate coat hereinafter), (ci) a high molecular weight polytetrafluoroethylene (PTFE) of an SSG below 2.19, present at a loading of between 25 to 200% by weight based on glass fabric (PTFE coat hereinafter), or (cii) an elastomeric fluoropolymer, present at a loading of 25-200% by weight based on weight of glass fabric (elastomer coat hereinafter), or (ciii) ci and cii in sequence.

DETAILED DESCRIPTION OF THE INVENTION

Only the particular sequence of coatings described above has been found to be effective to impart increased flex life, flexibility, and strength. Omission of any one of the three coatings (a), (b) or (c) impairs results, and combining coatings impairs results. For example combining primer oil coating (a) and primer particulate coating (b) into a mixture for single application to the fabric does not provide as good results as when the coatings are applied separately in sequence.

All the coatings are conveniently applied by passing the glass fabric through a dispersion containing the desired coating ingredient although the coatings can be applied by other techniques if desired, such as spraying, and the like.

The woven glass fabric can be any fabric made of glass fiber.

The first coat is a primer coat of silicone oil. Silicone oils have the formula

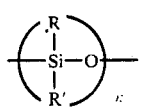

wherein R and R' are hydrocarbyl of 1-20 carbon atoms and n is an integer between 100 and 2000. Preferably R is alkyl of 1-6 carbon atoms and R' is phenyl. It is believed that the silicone oil acts as a lubricant to lubricate the individual glass fibers in the yarn making up the woven glass fabric. It is important to impregnate the fibers with the silicone oil to ensure that substantially all the fibers become coated. The silicone oil is usually applied from an aqueous dispersion in which the oil is present in an amount of between about 6-18 percent by weight, preferably 6-12%. It is important to apply the silicone oil first and alone (without any other coating ingredients) to ensure that the glass fibers are lubricated. The amount of silicone oil applied will be between 3 and 20% of the glass fabric by weight.

The second coat (the primer particulate coat) applied is a coating of inorganic particles or organic polymer particles of 0.3 micrometers or less (preferably less than 0.17 micrometers). Preferably it is polytetrafluoroethylene (PTFE) particles. There is no critical lower limit on particle size, but as a matter of practicality the particles are generally larger than 0.01 micrometers. It is important that the particles be applied from a dilute aqueous dispersion. A dilute dispersion is necessary to ensure that the particles impregnate the glass fabric and contact substantially all the individual fibers. A typical dilute dispersion will contain about 6-18 percent by weight particles. These particles can be PTFE, polystyrene and the like, or alumina, silica or carbon dispersions and the like. By applying the silicone oil, then the particles, the flex life of this 2-layer coated fabric is surprisingly high. The coated fabric can be sintered at this point if the particulate is PTFE, by heating above the melting point of PTFE but below the decomposition temperature. The total amount of both primer coats on the composite will be between 7 and 23% by weight. Too little of either primer coat will decrease flexibility; while too much will decrease flex life and other physical properties.

The third coat is either a high moleclar weight polytetrafluoroethylene or a film-forming elastomeric fluoropolymer, or both in sequence. The purpose of this coat is to coat fiber bundles and tie bundles together so that stress applied at one point is distributed. This improves the strength and flex life of the glass fabric. This coating is applied from an aqueous dispersion of 6-60 percent PTFE or elastomer solids. The loading applied is between 25 and 200%, preferably 40 and 140%, based on weight of glass fabric. When PTFE and elastomers are applied in sequence the total loading will generally be between about 100 and 170%.

When high molecular weight PTFE forms any part of this coat, it is dried and sintered. By "high molecular weight" PTFE is meant that the polymer has an SSG of less than 2.19.

When elastomer forms a part of this coat, it imparts protection and flexibility to the glass fabric as compared with the stiffness that is imparted when the high molecular weight PTFE is a part of this coat. Commonly, the elastomer will be a copolymer of tetrafluoroethylene and a perfluorinated alkoxy ethylene comonomer. The comonomer units make up 20-40 wt. % of the copolymer. By "elastomeric" is meant that a film of the material, when stretched under a load, regains its original shape when the load is removed. A preferred structure is one in which the PTFE and elastomer of this third coat are applied in sequence.

Analytical Tests

Loop Flexibility was measured using the Loop Flexibility Test (LFT). This test measures the flexibility of a coated material. The higher the number the greater the flexibility. The test is carried out by making a loop of a 1½ by 6-inch (3.8×15.2 cm) sample by connecting the ends together with taper or staples, placing a ¾-inch (1.9 cm) square steel block inside the loop, measuring the force (in grams) needed to push down the top of the loop (with a knife edge) until it contacted the top of the steel block, and calculating the LFT value by the equation:

$$LFT = 1350/\text{force needed (in grams)}.$$

Flex life was measured using a standard MIT folding endurance tester (5 lb weight (2.22 kg), #10 spring). Test samples were cut ½-inch (1.27 cm) wide so the fiber bundles ran 45° to the MIT jaws.

Tensile strength was measured using an Instron tensile tester at a strain rate of 2 inches per minute (5.08 cm/min). The samples were cut ½-inch (1.27 cm) wide so the fiber bundles ran at 45° to the length of the sample. In this manner, the tensile strength of the glass did not interfere with measuring the strength of the plastic holding the glass bundles together.

Standard specific gravity (SSG) of the molding powder is measured by water displacement of a standard molded test specimen in accordance with ASTM D1457-69. The standaard molded part is formed by preforming 12.0 g. of the molding powder in a 2.86 cm. diameter die at a pressure of 352 kg/cm$^2$, followed by the sintering cycle of the preform of heating from 300° to 380° C. at 2° C./min., holding at 380° C. for 30 minutes, cooling to 295° C. at 1° C./min. and holding at this temperature for 25 minutes, after which the specimen is cooled to room temperature and tested for specific gravity.

EXAMPLES

Showing A—Effect of Coating Only with Primer Coat of Silicone Oil

Burlington 15227 style glass fabric pieces were coated by hand dipping with an aqueous dispersion containing 20% methyl phenyl silicone oil, Dow Corning ET-4327. Various amounts of oil were applied by making one or more dips through the dispersion (oven drying the sample between each coating). The flexibility (LFT) of each sample is shown below.

| Oil Coating, wt % of fabric | 0 | 10 | 19 | 20 | 24 | 29 |
|---|---|---|---|---|---|---|
| LFT | | 34 | 42 | 45 | 52 | 79 |

Showing B—Effect of Blend of Primer Coat Silicone Oil and Primer Particulate Coat PTFE Burlington 15227 style glass fabric was coated using a coating tower and primer coat dispersions containing blends of oil (Dow Corning silicone oil emulsion ET-4327) and PTFE having an SSG below 2.19 (Du Pont TE-3170) and a particle size of 0.17 micrometer. The coating was dried at 270° C. and flexibility then measured.

| % Oil in Coating Bath | % PTFE in Coating Bath | Total Coating Weight % of fabric | Flexibility LFT |
|---|---|---|---|
| 3.8 | 25 | 20 | 23 |
| 3.8 | 11 | 8.9 | 31 |
| 7.3 | 11 | 10 | 32 |

Showing C—Effect of Applying Silicone Oil then PTFE in Sequence, followed by drying but not sintering Burlington 15227 fabric was sequentially coated by passing it through the same silicone oil emulsion, then drying the fabric, then passing it through a dilute PTFE (Du Pont 3170) aqueous dispersion in a laboratory coating tower (270° C. drying temperature). The PTFE particles were less than 0.3 micrometer in size. Two runs were carried out. In both, the % oil in the coating bath was 7.3% and the % PTFE in the coating bath was 11%. Results of the runs were:

Run 1—3.9% oil and 5% PTFE were on the fabric. The LFT was 60.

Run 2—6.1% oil and 5% PTFE were on the fabric. The LFT was 54.

Showing D—Effect on Product when the Product is Sintered Instead of Dried

Burlington 15227 fabric was sequentially coated through the silicone oil bath, then dried at 230° C., then passed through the PTFE dispersion by hand dipping, followed by sintering at 350° C., with the following results (the PTFE particles were less than 0.3 micrometer in size):

| Oil in Oil Bath | | 7.3% |
| PTFE Bath Concentration | | 11% |
| Coating Weight of Oil* | Coating Weight of PTFE* | Flexibility LFT |
|---|---|---|
| Run 1 | 5.1 | 4.6 | 76 |
| Run 2 | 4.7 | 4.2 | 72 |
| Run 3 | 4.7 | 4.3 | 78 |
| Run 4 | 4.8 | 4.7 | 71 |

*% of fabric weight

Comparing Showings A, B, C and D, it is evident that sequential coating is necessary, and that drying after the silicon oil is applied is necessary, and that sintering the PTFE layer is preferred.

EXAMPLE 1—Effect of Top Coat

Samples of Burlington 15227 style fiber glass fabric were first dip coated with a sequential prime coat using a 12% methylphenyl silicone oil aqueous dispersion followed by drying, followed with a 6% aqueous dispersion of PTFE (TE-3170) particulate of particle size 0.17 micrometer. By calculation and extrapolation of results with other samples, the silicone oil loading was about 7% by weight based on glass fabric and the PTFE loading was about 4%. Then the samples were dip coated through one of the following listed dispersions in Table 1 below to determine the effect of various additional coatings at several coating weights on flexibility and flex life. After the last coating the composite was sintered.

TABLE 1

In this table the following symbols are used:
PTFE=polytetrafluoroethylene
PPVE=perfluoropropylvinyl ether
HFP=hexafluoropropylene
TFE=tetrafluoroethylene

EXAMPLE 1

High molecular weight PTFE (TE-3512)-SSG of less than 2.19 (This is component ci)

EXAMPLE 2

PPVE/TFE copolymer containing about 45% PPVE by weight (an elastomer). This is component cii.

EXAMPLE 3

Dispersion of PTFE homopolymer containing about 1½% by wt of TFE/HFP copolymer. (TE 3313). The homopolymer has an SSG of 2.275 and a particle size of 0.22 micrometer. (This is component ci).

EXAMPLE 4

A fluoroelastomer of TFE (54.7%), perfluoro (methyl vinyl ether) (45%) and vinylidene fluoride (0.3%). (This is component cii).

COMPARISON 1

A copolymer of a tetrafluoroethylene (TFE) and hexafluoropropene (HFP) (88.4/11.6, by weight) (this is not an elastomer).

COMPARISON 2

PPVE/TFE copolymer containing about 17% PPVE by weight. PPVE is perfluoropropyl vinyl ether. (This is not an elastomer).

The Comparisons show that use of nonelastomeric copolymers are not as effective as elastomers or TFE homopolymer.

The flexibility (LFT) and flex life (MIT) data of the coated samples are in Table 2 as follows:

EXAMPLE 5

Burlington 15227 glass fabric was heat cleaned and placed in a laboratory coating tower. It was first passed through 7.3% methylphenyl silicone oil (ET-4327) emulsion at 2 ft/min (0.61 m/min.) to obtain an oil coating of about 5% on glass fabric. It was dried and next passed through an 11% PTFE dispersion (TE 3170) (particle size, 0.17 micrometer) to provide a coating of about 5% based on glass fabric. After drying, it was then passed through a 35% dispersion of a high molecular weight (SSG of 2.16) PTFE to provide a 29% coating based on glass fabric. The coated fabric was then sintered at 360° C. It was then passed through a 52% solids dispersion of TFE/PPVE (55/45) elastmeric copolymer. The coating of copolymer amounted to 119% of the glass fabric. Thus this is an Example of coating with component Ci and Cii in sequence.

The MIT Flex Life test of the resulting composite was 133,000 flexes. The LFT Flexibility was 20.

EXAMPLE 6

The procedure of Example 5 was followed using silicone oil bath concentrations of 6, 12 and 18% and the PTFE second pass bath concentrations of 6, 12, 18, 45%. The fabric was heat treated B15227 style glass cloth. The resultant sequentially primed fabric was then coated through a 58% solids bath of PTFE (bundle coat (Ci)) and sintered to obtain a 39% PTFE coating based on glass fabric. A coating tower was used to apply the primer and bundle coats. Finally about 111% of a

TABLE 2

| Example 1 | | | | | | | |
|---|---|---|---|---|---|---|---|
| PTFE Coating Wt (% of glass) | 16 | 55 | 82 | 110 | 126 | 159 | 187 |
| LFT | 19 | 7.7 | 4.9 | 3.3 | 2.8 | 3.1 | 2.7 |
| MIT ($10^3$ of Flexes) | 0.005 | 177 | 55 | 34 | 91 | 52 | 12 |
| Tensile Strength kg/cm | 0.43 | 3.82 | 4.59 | 5.30 | 4.79 | 4.88 | 3.98 |
| Example 2 (Copolymer: TFE/PPVE = 55/45 - an elastomer) | | | | | | | |
| Copolymer Coating Wt (% of glass) | 28 | 62 | 81 | 108 | 124 | 159 | 182 |
| LFT | 18.9 | 14.0 | 12.2 | 12.9 | 11.6 | 8.7 | 10.5 |
| MIT ($10^3$ of Flexes) | .08 | 23.8 | 138.5 | 62.7 | 51.0 | 45.2 | 33.8 |
| Tensile Strength kg/cm | 0.98 | 3.29 | 4.21 | 4.07 | 4.59 | 5.07 | 5.39 |
| Example 3 PTFE plus TFE/HFP | | | | | | | |
| Polymer Coating Wt (% of glass) | 31 | 64 | 66 | 91 | 109 | 137 | 143 |
| LFT | 25.1 | 12.6 | 10.7 | 5.4 | 4.1 | 2.9 | 1.6 |
| MIT ($10^3$ of Flexes) | 0.02 | 58.2 | 82.3 | 63.9 | 55.3 | 37.8 | 455 |
| Tensile Strength Mg/cm | 0.52 | 3.52 | 3.63 | 3.82 | 4.07 | 4.00 | 3.66 |
| Example 4 (PMVE/TFE/VF$_2$) | | | | | | | |
| Copolymer Coating Wt (% of glass) | 31 | 44 | 69 | 93 | 116 | 133 | 139 |
| LFT | 51.7 | 43.6 | 40.1 | 38.1 | 35.1 | 34.0 | 17.7 |
| MIT (10 of Flexes) | 2.5 | 3.4 | 6.2 | 8.4 | 15.9 | 10 | 13.9 |
| Comparison 1 (TFE/HFP) | | | | | | | |
| Copolymer Coating Wt (% of glass) | 16 | 49 | 77 | 104 | 137 | 148 | 170 |
| LFT | 13 | 4.8 | 3.6 | 2.8 | 2.0 | 1.7 | 1.6 |
| MIT ($10^3$ of Flexes) | 0 | 152 | 65 | 53 | 92 | 119 | 3.5 |
| Tensile Strength kg/cm | 0.48 | 4.21 | 5.27 | 6.77 | 6.88 | 7.36 | 7.8 |
| Comparison 2 (Copolymer: PPVE/TFE = 17/83) | | | | | | | |
| Copolymer Coating Wt (% of glass) | 22 | 49 | 66 | 93 | 110 | 143 | 170 |
| LFT | 15 | 7.3 | 4.4 | 3.0 | 2.5 | 1.8 | 1.5 |
| MIT (% of glass) of Flexes) | 0 | 80.7 | 136 | 93 | 25.7 | 19.1 | 12.2 |
| Tensile Strength kg/cm | 0.61 | 2.41 | 3.45 | 3.43 | 3.31 | 2.84 | 3.61 |

TFE/PPVE (55/45) elastomeric copolymer topcoat (Cii) was applied by hand dipping through a 52% solids bath. By calculation and extrapolation of results on other samples, the silicone oil loads and the PTFE second pass loadings were determined to as follows: For the 6, 12 and 18% concentration of silicone oil; 3%, 7% and 11% loadings respectively. For the 6, 12, 18 and 45% concentration of PTFE, 4, 7, 11 and 28% by weight of glass fabric respectively.

The coating drying temperatures were:
Oil primer coating—230° C.
Primer particulate coat—250° C.
PTFE bundle coat (TE-3313)—325° to 360° C.
Elastomer Top coat—150° C.

The flexibility, flex life and tensile strength were measured with following results:

TABLE 3

| | LFT Flexibility Silicone | | |
|---|---|---|---|
| % PTFE in | % Oil in First Bath | | |
| Second Bath | 6 | 12 | 18 |
| 6 | 9.7 | 10.9 | 13.2 |
| 12 | 8.8 | 13.5 | 11.5 |
| 18 | 9.2 | 11.5 | 13.3 |
| 45 | 7.8 | 10.6 | 10.2 |

TABLE 4

| | Flex-Life, MIT × 10³ | | |
|---|---|---|---|
| % PTFE in | % Oil in First Bath | | |
| Second Bath | 6 | 12 | 18 |
| 6 | 182 | 120 | 102 |
| 12 | 253 | 97 | 81 |
| 18 | 255 | 187 | 78 |
| 45 | 201 | 137 | 142 |

TABLE 5

| | Tensile Strength, kg/cm | | |
|---|---|---|---|
| % PTFE in | % Oil in First Bath | | |
| Second Bath | 6 | 12 | 18 |
| 6 | 17.7 | 16.1 | 17.0 |
| 12 | 14.7 | 15.6 | 14.2 |
| 18 | 16.8 | 15.4 | 15.9 |
| 45 | 16.7 | 14.2 | 14.5 |

The tensile strength shows the ability of the polymer to transfer an externally applied stress from one fiber bundle to another. The higher this value, the stronger the fabric (see description of T.S. measurement).

EXAMPLE 7

Heat treated B15227 style glass fabric was coated by hand dipping through the following baths:
One pass through 6% silicone oil (ET-4327)—dried at 150° C.
One pass through 12% PTFE particulate size, 0.17 micrometer—dried at 350° C.
Several passes through 55% PTFE (TE-3512)—dried at 350° C. (coat Ci)
Several passes through TFE/PPVE (55/45%) copolymer—dried at 150° C. (coat Cii)

| Coating | Oil | Primer | PTFE Bundle | TFE/PPVE Top Coat | Total |
|---|---|---|---|---|---|
| Coating Wt % of fabric | 3 | 5 | 63 | 91 | 162 |

LFT Flexibility = 9.3
MIT Flex Life = 55,000
Tensile Strength, kg/cm = 5.31

I claim:
1. A composite consisting of woven glass fabric which contains coatings in sequence of
   (a) a silicone oil present on the glass fabric at a loading of between 3 and 20% by weight based on glass fabric,
   (b) a particulate organic polymer or inorganic solid in which the particles are less than 0.3 micrometers, present at a loading of between 4 and 14% by weight based on glass fabric,
   (c)i a high molecular weight polytetrafluoroethylene having an SSG below 2.19, or
   (c)ii an elastomeric fluoropolymer, or
   (c)iii a coating made of ci followed by cii,
   wherein the total loading made up of coating (c) is between 25 and 200% by weight based on glass fabric.
2. The composite of claim 1 wherein the total loading of coatings (a) and (b) is between 7 and 23% by weight based on glass fabric, and the total loading of component (c) is between 40 and 170% by weight based on glass fabric.
3. The composite of claim 1 wherein coating (b) is particulate polytetrafluoroethylene and coating (c) Is comprised of coatings (c)i and (c)ii in sequence.
4. Process for preparing a composite of claim 1 which comprises coating the fabric with the silicone oil and a dilute dispersion of the particulate in sequence, with drying between steps, followed by applying coating c(i) or (c)ii, or (c)i and (c)ii in sequence.

* * * * *